(12) United States Patent
Han et al.

(10) Patent No.: US 11,337,073 B2
(45) Date of Patent: May 17, 2022

(54) ELECTRONIC APPARATUS AND METHOD OF CONTROLLING THEREOF

(71) Applicant: SAMSUNG ELECTRONICS CO., LTD., Suwon-si (KR)

(72) Inventors: Seongwon Han, Suwon-si (KR); Donguk Kim, Suwon-si (KR); Woojin Park, Suwon-si (KR); Choonghoon Lee, Suwon-si (KR); Hosun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/094,470

(22) Filed: Nov. 10, 2020

(65) Prior Publication Data

US 2021/0195425 A1 Jun. 24, 2021

(30) Foreign Application Priority Data

Dec. 20, 2019 (KR) ........................ 10-2019-0171949

(51) Int. Cl.
*H04W 12/122* (2021.01)
*H04W 12/02* (2009.01)
(Continued)

(52) U.S. Cl.
CPC ......... *H04W 12/122* (2021.01); *H04W 4/023* (2013.01); *H04W 12/02* (2013.01); *H04W 12/63* (2021.01)

(58) Field of Classification Search
CPC ..... H04W 4/80; H04W 4/023; H04W 64/003; H04W 24/10; H04W 4/029; H04W 64/00;
(Continued)

(56) References Cited

U.S. PATENT DOCUMENTS

| 9,282,435 B2 | 3/2016 | Ward et al. |
| 2015/0168532 A1 | 6/2015 | Hampel et al. |

(Continued)

FOREIGN PATENT DOCUMENTS

| JP | 2019-28618 A | 2/2019 |
| KR | 10-1459915 B1 | 11/2014 |

(Continued)

OTHER PUBLICATIONS

"Wi-Fi Aware : Discover the world nearby (English)", Wi-Fi Alliance, published Jan. 5, 2015, https://www.youtube.com/watch?v=xwSYPqqhTsQ, 2 pages total.
(Continued)

*Primary Examiner* — Kwasi Karikari
(74) *Attorney, Agent, or Firm* — Sughrue Mion, PLLC

(57) ABSTRACT

An electronic apparatus determining whether an external device spoofs a location thereof includes a communicator, a memory, and a processor configured to receive a first beacon signal and a second beacon signal from a first external device and a second external device, respectively, through the communicator, obtain information on a first distance between the electronic apparatus and the first external device, and information on a second distance between the electronic apparatus and the second external device, based on the first beacon signal and the second beacon signal, respectively, receive information on a third distance between the first external device and the second external device from at least one of the first external device and the second external device through the communicator, and identify whether the first external device spoofs an actual location of the first external device relative to the electronic apparatus, based on the first distance, the second distance, and the third distance.

19 Claims, 11 Drawing Sheets

(51) Int. Cl.
*H04W 12/63* (2021.01)
*H04W 4/02* (2018.01)

(58) Field of Classification Search
CPC ..... H04W 12/50; H04W 4/025; H04W 4/027; H04W 52/0245; H04W 52/245
See application file for complete search history.

(56) References Cited

U.S. PATENT DOCUMENTS

| | | |
|---|---|---|
| 2016/0066154 A1 | 3/2016 | Shin |
| 2016/0202343 A1* | 7/2016 | Okutsu ............... G01S 5/18 342/464 |
| 2016/0212587 A1* | 7/2016 | Cho ............... H04W 4/023 |
| 2017/0041973 A1 | 2/2017 | Liao et al. |
| 2017/0118754 A1 | 4/2017 | Kang |
| 2017/0192085 A1* | 7/2017 | Wagner ............... G01S 5/10 |
| 2018/0007067 A1 | 1/2018 | Kaushik |
| 2018/0332075 A1 | 11/2018 | Chhabra et al. |
| 2019/0037361 A1 | 1/2019 | Nakamura |
| 2019/0116456 A1 | 4/2019 | Arunkumar et al. |

FOREIGN PATENT DOCUMENTS

| | | |
|---|---|---|
| KR | 10-2016-0033576 A | 3/2016 |
| KR | 10-1624343 B1 | 5/2016 |
| KR | 10-2018-0104411 A | 9/2018 |
| KR | 10-2019-0123996 A | 11/2019 |
| WO | 2016/043388 A1 | 3/2016 |
| WO | 2016/043389 A1 | 3/2016 |

OTHER PUBLICATIONS

"Neighbor Awareness Networking Specification", Version 3.0, Wi-Fi Alliance, published 2018, 204 pages total.
International Search Report and Written Opinion dated Mar. 2, 2021, issued by the International Searching Authority in International Application No. PCT/KR2020/016218 (PCT/ISA/210 and 237).

* cited by examiner

ELECTRONIC APPARATUS AND METHOD OF CONTROLLING THEREOF

CROSS-REFERENCE TO RELATED APPLICATION(S)

This application is based on and claims priority under 35 U.S.C. § 119(a) of a Korean Patent Application No. 10-2019-0171949, filed on Dec. 20, 2019, in the Korean Intellectual Property Office, the disclosure of which is herein incorporated by reference in its entirety.

BACKGROUND

1. Field

The disclosure relates to an electronic apparatus and a method of controlling thereof. More particularly, the disclosure relates to an electronic apparatus capable of effectively detecting spoofing of location information and a method of controlling thereof.

2. Description of the Related Art

In recent years, with the development of Internet of Things (IoT) technology, the development of various types of proximity-based technologies between a plurality of nearby devices using location information is accelerating.

However, as the proximity-based technologies develop, methods of threatening security of other devices are diversifying. For example, some circumvention techniques include spoofing location information of a specific device or spoofing presence of a non-existent device existing in a specific location.

In particular, if security of devices is simplified for the convenience of sharing location information or a random media access control (MAC) address is used to protect users' privacy, the security of the device with respect to spoofing of location information may be vulnerable to exploitation.

SUMMARY

The disclosure is described to overcome the problems described above, and an object of the disclosure is to provide an electronic apparatus capable of effectively detecting spoofing of location information based on information received from a plurality of external devices located at a distance nearby to the electronic apparatus, and a method of controlling thereof.

According to an embodiment of the disclosure, an electronic apparatus includes a communicator including a circuit, a memory configured to store at least one instruction, and a processor configured to execute the at least one instruction, wherein the processor is configured to, based on the at least one instructing being executed, receive a first beacon signal from a first external device and a second beacon signal from a second external device, through the communicator, obtain first information indicating a first distance between the electronic apparatus and the first external device, based on the first beacon signal, and obtain second information indicating a second distance between the electronic apparatus and the second external device, based on the second beacon signal, receive third information indicating a third distance between the first external device and the second external device, from at least one of the first external device and the second external device, through the communicator, and identify whether the first external device spoofs an actual location of the first external device relative to the electronic apparatus, based on the first distance, the second distance, and the third distance.

According to an embodiment of the disclosure, a method of controlling an electronic apparatus includes receiving a first beacon signal and a second beacon signal from a first external device and a second external device, respectively, obtaining first information indicating a first distance between the electronic apparatus and the first external device, based on the first beacon signal, obtaining second information indicating a second distance between the electronic apparatus and the second external device, based on the second beacon signal, receiving third information indicating a third distance between the first external device and the second external device from at least one of the first external device and the second external device, and identifying whether the first external device spoofs an actual location of the first external device relative to the electronic apparatus, based on the first distance, the second distance, and the third distance.

According to an embodiment of the disclosure, a computer-readable recording medium including a program for executing a method of controlling an electronic apparatus, the method of controlling the electronic apparatus includes receiving a first beacon signal and a second beacon signal from a first external device and a second external device, respectively, obtaining first information indicating a first distance between the electronic apparatus and the first external device, based on the first beacon signal, obtaining second information indicating a second distance between the electronic apparatus and the second external device, based on the second beacon signal, receiving third information indicating a third distance between the first external device and the second external device from at least one of the first external device and the second external device, and identifying whether the first external device spoofs an actual location of the first external device relative to the electronic apparatus, based on the first distance, the second distance, and the third distance.

DETAILED DESCRIPTION

Figure 1:
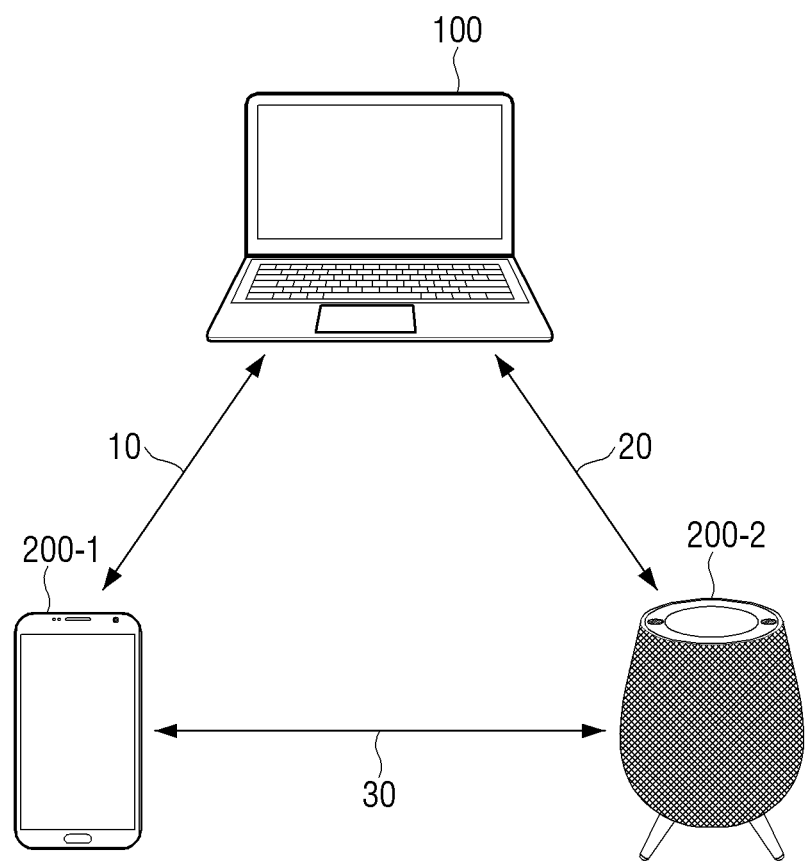
FIG. 1 is a view illustrating a process of identifying spoofing of location information of an electronic apparatus according to an embodiment of the disclosure.

The disclosure provides several embodiments, and the embodiments may be modified variously. In the following description, specific embodiments are provided with accompanying drawings and detailed descriptions thereof. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

In describing exemplary embodiments, detailed description of relevant known functions or components may be omitted to avoid obscuring the description of the subject matter.

In addition, the exemplary embodiments may be changed in various forms, and therefore, the technical scope is not limited to the following exemplary embodiments. Rather, these exemplary embodiments are provided to make the disclosure thorough and complete.

The terms used herein are solely intended to explain a specific exemplary embodiment, and not to limit the scope of the disclosure. Singular forms are intended to include plural forms unless the context clearly indicates otherwise.

The terms "have," "may have," "include," and "may include" used in the exemplary embodiments of the present disclosure indicate the presence of corresponding features (for example, elements such as numerical values, functions, operations, or parts), and do not preclude the presence of additional features.

In the description, the term "A or B," "at least one of A or/and B," or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1," "2," "first," or "second" as used herein may modify a variety of elements, irrespective of order and/or importance thereof, and only to distinguish one element from another. Accordingly, without limiting the corresponding elements.

If a certain element (e.g., first element) is described as "operatively or communicatively coupled with/to" or is "connected to" another element (e.g., second element), it should be understood that the certain element may be connected to the other element directly or through still another intervening element (e.g., third element).

On the other hand, when an element (e.g., a first element) is "directly coupled with/to" or "directly connected to" another element (e.g., a second element), an intervening element may not exist between the elements.

In the description, the term "configured to" may be interchanged with, for example, "suitable for," "having the capacity to," "designed to," "adapted to," "made to," or "capable of" under certain circumstances. The term "configured to (set to)" does not necessarily mean "specifically designed to" in a hardware level.

Under certain circumstances, the term "device configured to" may refer to "device capable of" doing something together with another device or components. For example, "a sub-processor configured (or configured to) perform A, B, and C" may refer to a generic-purpose processor (e.g., CPU or an application processor) capable of performing corresponding operations by executing a dedicated processor (e.g., an embedded processor) or one or more software programs stored in a memory device to perform the operations.

In the embodiments disclosed herein, a term 'module' or 'unit' refers to an element that performs at least one function or operation. The 'module' or 'unit' may be realized as hardware, software, or combinations thereof. In addition, a plurality of 'modules' or 'units' may be integrated into at least one module and may be realized as at least one processor in an integrated manner except for 'modules' or 'units' that should be realized in specific hardware.

Further, various elements and areas in the drawings are schematically drawn. Therefore, the technical ideas are not limited by a relative size or interval illustrated in the accompanying drawings.

An electronic apparatus 100 according to various exemplary embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, camera, or a wearable device. The wearable device may include at least one of an accessory type device (for example, a watch, a ring, a bracelet, an ankle bracelet, a necklace, glasses, a contact lens, or a head-mounted device (HMD)), a fabric-mounted device or clothing-mounted device (for example, electronic apparels), a body-mounted device (for example, a skin pad, tattoos, etc.), or a bio-implantable device (for example, an implantable circuit).

In other embodiments, the electronic apparatus 100 may include at least one of, for example, TVs, digital video disc (DVD) players, audios, refrigerators, air conditioners, cleaners, ovens, microwave ovens, washing machines, air cleaners, set-top boxes, home automation control panels, security control panels, media boxes (for example, Samsung HomeSync™, Apple TV™, or Google TV™), game consoles (for example, Xbox™ and PlayStation™), electronic dictionaries, electronic keys, camcorders, or electronic picture frames.

In other embodiments, the electronic apparatus 100 may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, an automatic teller's machine of a financial institute, a point of sales (POS) of a shop, and Internet of things (IoT) devices (for example, a light bulb, various sensors, an electric or gas meter, a sprinkler system, a fire alarm, a thermostat, a street light, a toaster, an exercise equipment, a hot water tank, a heater, a boiler, and the like).

FIG. 1 is a view illustrating a process of identifying spoofing of location information of an electronic apparatus 100 according to an embodiment of the disclosure.

Throughout the disclosure, "location information" includes information on relative locations between devices in a communication network, and in particular, is used to include information on a distance and/or direction between devices. In addition, "spoofing of location information" is a generic term for an attacking method that threatens the security of other devices by obfuscating, altering, or otherwise misidentifying the location information of a specific device or by feigning existence of a non-existent device as if the illusory device exists in a specific location.

An attacker who spoofs location information may alter information on a distance between a device and another device by manipulating timing information or timestamp information of a beacon signal transmitted by the device. Accordingly, the attacker may threaten the security of other devices with a method of disabling a proximity-based unlock function. For example, the attacker may manipulate the timing information of the beacon signal transmitted from a smartphone to trick the smartphone into accessing a laptop, thereby unlocking the laptop and stealing user's personal information included in the laptop.

The disclosure relates to a technology for effectively detecting spoofing of location information as described above. Hereinafter, a process of identifying spoofing of location information will be described with a description of a wireless communication system according to an embodiment of the disclosure with reference to FIG. 1.

The electronic apparatus 100 and the external device as shown in FIG. 1 may be connected to a wireless LAN (WLAN) system according to the disclosure. In other words, the electronic apparatus 100 and the external device 200-1, 200-2 (referenced as 200) are devices in communication according to a medium access control (MAC) of the IEEE 802.11 standard (or other wireless communication standard) and a physical layer interface with respect to a wireless medium. The networked devices may include an access point (AP) as well as a station (STA) that is a non-access point (Non-AP). In particular, the electronic apparatus 100 and the external device 200 may correspond to NAN terminals constituting a neighbor awareness network (NAN). For example, the electronic apparatus 100 and the external device 200 may correspond to a NAN terminal, and may, for example, search for a neighboring NAN terminal located in a near field and establish a communication connection of the neighboring NAN terminal through Wi-Fi aware technology that operates based on the NAN.

Hereinafter, in order to clearly describe the disclosure, the IEEE 802.11 networked system is mainly described, but the wireless communication system according to the disclosure is not limited thereto. Meanwhile, FIG. 1 illustrates a laptop, a smart phone 200-1, and an artificial intelligence speaker 200-2 as examples of the electronic apparatus 100 and the plurality of external devices 200, respectively. However, the examples merely correspond to an embodiment of the electronic apparatus 100 and the external device 200 according to the disclosure.

According to an embodiment of the disclosure, the electronic apparatus 100 may receive a first beacon signal and a second beacon signal from a first external device 200-1 and a second external device 200-2, respectively. The beacon signal according to the disclosure is a beacon signal defined according to the IEEE 802.11 standard, and may be repeatedly transmitted from each of a plurality of external devices at an interval of predetermined time. Specifically, the beacon signal may include identification information such as a media access control (MAC) address, timestamp information related to transmission and reception times of the beacon signal, information on a transmission interval and period of the beacon signal, and various types of defined fields according to the IEEE 802.11 standard.

When the first beacon signal and the second beacon signal are received from the first external device 200-1 and the second external device 200-2, respectively, the electronic apparatus 100 may acquire information on a first distance 10 between the electronic apparatus 100 and the first external device 200-1 and information on a second distance 20 between the electronic apparatus 100 and the second external device 200-2. In particular, the electronic apparatus 100 may acquire information on the first distance 10 and information on the second distance 20 by using a fine time measurement (FTM) protocol described in detail with reference to FIG. 3A.

The electronic apparatus 100 may receive information on a third distance 30 between the first external device 200-1 and the second external device 200-2 from at least one of the first external device 200-1 and the second external device 200-2. For example, the electronic apparatus 100 may transmit a signal including a request to obtain information on the third distance 30 between the first external device 200-1 and the second external device 200-2, to at least one of the first external device 200-1 and the second external device 200-2, and receive information on the third distance 30 from at least one of the first external device 200-1 and the second external device 200-2.

Information on the third distance 30 between the first external device 200-1 and the second external device 200-2 may be included in a frame of the beacon signal, but may be transmitted to the electronic apparatus 100 by the first external device 200-1 and the second external device 200-2 through a separate protocol. Specifically, when the electronic apparatus 100 at least one of the first external device 200-1 and the second external device 200-2 for the information on the third distance 30, at least one of the first external device 200-1 and the second external device 200-2 may acquire information on the third distance 30 and transmit the obtained information on the third distance 30 as a reply to the request of the electronic apparatus 100.

Meanwhile, the electronic apparatus 100 may identify whether location information is spoofed by at least one of the first external device 200-1 and the second external device 200-2 based on the information on the first distance 10, information on the second distance 20, and information on the third distance 30. Here, the identifying whether the location information is spoofed by at least one of the first external device 200-1 and the second external device 200-2 may refer to determining whether at least one location information among the first external device 200-1 and the second external device 200, as reported according to the information on a first distance 10 between the electronic apparatus 100 and the first external device 200-1 and the information on a second distance 20 between the electronic apparatus 100 and the second external device 200-2, is different from an actual location. In other words, identifying whether the location information is spoofed by at least one of the first external device 200-1 and the second external device 200-2 may be determined according to whether at least one of a case that the location information of the first external device 200-1 is different from an actual location of the first external device 200-1, which may correspond to actual location information expected to be received according to analysis of the distances (10, 20, 30), and a case that the location information of the second external device 200-2 is different from an actual location of the second external device 200-2, which may correspond to actual location information expected to be received according to analysis of the distances (10, 20, 30). Specifically, if it is identified that there is a contradiction between the first distance 10, the second distance 20, and the third distance 30 based on analysis of the information on the first distance 10, information on the second distance 20, and information on the third distance 30, respectively, the electronic apparatus 100 may identify that there is spoofing of location information by at least one of the first external device 200-1 and the second external device 200-2. The "contradiction" may indicate that the third the third distance 30 obtained based on information on the third distance 30 is not included within a range of the third distance 30 calculated based on the information on the first distance 10 and the information on the second distance 20.

For example, the electronic apparatus 100 may identify that a first distance 10 between the electronic apparatus 100 and the first external device 200-1 is 10 m based on the information on the first distance 10, and identify that the second distance 20 between the electronic apparatus 100 and the second external device 200-2 is 3 m based on the information on the second distance 20. When it is identified that the first distance 10 is 10 m and the second distance 20 is 3 m, the third distance 30 between the first external device 200-1 and the second external device 200-2 may be within a range from 7 m corresponding to a difference between the first distance 10 and the second distance 20 to 13 m corresponding to a sum of the first distance 10 and the second distance 20. However, if the third distance 30 obtained based on the information on the third distance 30 is 5 m, the third distance 30 obtained based on the information on the third distance 30 is not between 7 m to 13 m, which is the range of the third distance 30 calculated based on the information on the first distance 10 and the information on the second distance 20. Accordingly, in this case, the electronic apparatus 100 may identify that there is spoofing of location information by at least one of the first external device 200-1 and the second external device 200-2.

According to an embodiment of the disclosure as described above, when an attacker attempts to unlock a laptop 100 by manipulating timing information of a beacon signal transmitted from a smartphone 200-1 to trick the smartphone 200-1 into accessing the laptop 100, the laptop 100 may detect spoofing of location information of the attacker using information received from nearby artificial intelligence speakers 200-2.

According to the method described above, the electronic apparatus 100 may identify that there is spoofing of location information by at least one of the first external device 200-1 and the second external device 200-2. However, it may be difficult to clearly specify an attacker who spoofs location information among the first external device 200-1 and the second external device 200-2. Various embodiments of specifying an attacker who spoofs location information among the first external device 200-1 and the second external device 200-2 and increasing a rate of detecting the spoofing of location information will be described in detail with reference to FIG. 2.

Figure 2:
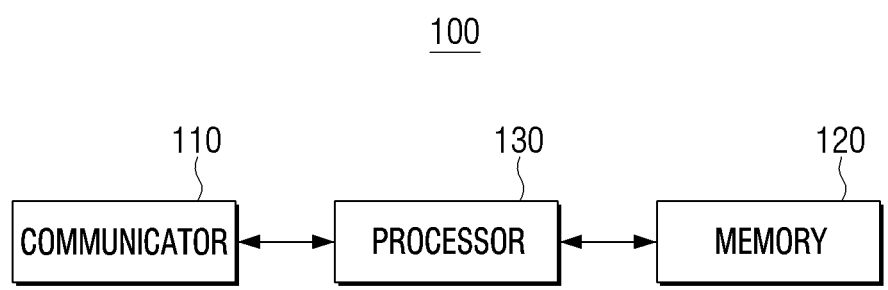
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

As illustrated in FIG. 2, the electronic apparatus 100 may include a communicator 110, a memory 120, and a processor 130.

The communicator 110 may include communication circuitry and may support communication between the electronic apparatus 100 and a server or another external device. Specifically, the processor 130 may receive various data or information from a server or an external device through the communicator 110, and may transmit various data or information to the server or the external device.

In various embodiments of the disclosure, the communicator 110 may perform wireless communication between the electronic apparatus 100 included in a wireless LAN system and an external device as described above with reference to FIG. 1. Specifically, the communicator 110 may receive a beacon signal from a plurality of external devices, and may receive information on a distance between a plurality of external devices. Also, the communicator 100 may transmit a beacon signal to an external device under the control of the processor 130.

At least one instruction regarding the electronic apparatus 100 may be stored in the memory 120. In addition, an operating system (O/S) for driving the electronic apparatus 100 may be stored in the memory 120. In addition, various software programs or applications for operating the electronic apparatus 100 may be stored in the memory 120 according to embodiments of the disclosure. The memory 120 may include a semiconductor memory such as a flash memory or a magnetic storage medium such as a hard disk, or the like.

Specifically, various software modules for operating the electronic apparatus 100 may be stored in the memory 120 according to various embodiments of the disclosure, and the processor 130 may load into random access memory (RAM) and execute various software modules stored in the memory 120 to control the operation of the electronic apparatus 100. In other words, the memory 120 may be accessed by the processor 130, and data operations (read/write/edit/delete/update) may be performed by the processor 130.

The term memory 120 in the disclosure may refer to a memory 120, a ROM in the processor 130, a RAM, or a memory card disposed in the electronic apparatus 100 (e.g. a micro SD card, a memory stick).

In particular, in various embodiments according to the disclosure, the memory 120 may store various information such as information on a distance between the electronic apparatus 100 and an external device, information on a distance between a plurality of external devices, and identification information for identifying a pre-registered external device, information on a time that an external device transmits a beacon signal, or the like.

In addition, various information necessary within a range for achieving the object of the disclosure may be stored in the memory 120, and the information stored in the memory 120 may be updated upon receipt from a server or an external device or input by a user. If the information stored in the memory 120 as described above is stored in a database, a detection rate of spoofing of location information according to the disclosure may be increased.

The processor 130 may control the overall operation of the electronic apparatus 100. Specifically, the processor 130 may be connected through one or more buses or other communication means of the electronic apparatus 100 including the communicator 110 and the memory 120 as described above, and control the overall operation of the electronic apparatus 100 by executing at least one instruction stored in the memory descried above.

The processor 130 may be realized by various methods. For example, the processor 130 may be at least one of an application-specific integrated circuit (ASIC), an embedded processor, a microprocessor, hardware control logic, hardware finite state machine (FSM), and a digital signal processor (DSP). Throughout the disclosure, the term processor 130 may be used to include a central processing unit (CPU), a graphical processing unit (GPU), a main processing unit (MPU), or the like.

According to various embodiments of the disclosure, the processor 130 may receive a first beacon signal and a second beacon signal from the first external device and the second external device, respectively, through the communicator 110. The beacon signal has been described above with reference to FIG. 1.

When the first beacon signal and the second beacon signal are received from the first external device and the second external device, respectively, the processor 130 may obtain information on a first distance between the electronic apparatus 100 and the first external device, and information on a second distance between the electronic apparatus 100 and the second external device. In particular, the processor 130 may acquire information on the first distance and information on the second distance using a fine time measurement (FTM) protocol, which will be described in detail with reference to FIGS. 3A and 3B.

The processor 130 may receive information on a third distance between the first external device and the second external device from at least one of the first external device and the second external device through the communicator 110. Specifically, the processor 130 may control the communicator 110 to transmit a signal requesting the information on the third distance between the first external device and the second external device, to at least one of the first external device and the second external device, and receive information on the third distance from at least one of the first external device and the second external device through the communicator 110.

The information on the third distance between the first external device and the second external device may be selectively included in a frame of the beacon signal, but may be transmitted to the electronic apparatus 100 from the first external device and the second external device through a separate protocol. Specifically, when the electronic apparatus 100 requests information on the third distance from at least one of the first external device and the second external device, at least one of the first external device and the second external device for which information on the third distance are requested may acquire information on the third distance as described below with reference to FIGS. 3A and 3B, and transmit the obtained information on the third distance to the electronic apparatus 100.

Meanwhile, the processor 130 may identify whether location information is spoofed by at least one of the first external device and the second external device based on information on the first distance, information on the second distance, and information on the third distance.

Specifically, if it is identified that there is a contradiction between the first distance, the second distance and the third distance obtained based on information on the first distance, information on the second distance, and information on the third distance, the processor 130 may identify that there is spoofing of location information by at least one of the first external device and the second external device. As described above, the "contradiction" between the first distance, the second distance, and the third distance may be that the third distance is outside a possible range of the third distance calculated based on the information on the first distance and the information on the second distance. The "contradiction" indicates that the third the third distance obtained based on information on the third distance is not included within a range of the third distance calculated based on the information on the first distance and the information on the second distance.

For example, the processor 130 may identify that a first distance between the electronic apparatus 100 and the first external device is 10 m based on the information on the first distance, and identify that the second distance between the electronic apparatus 100 and the second external device is 1 m based on the information on the second distance. When it is identified that the first distance is 10 m and the second distance is 1 m, the third distance between the first external device and the second external device may be within a range from 9 m corresponding to a difference between the first distance and the second distance to 11 m corresponding to a sum of the first distance and the second distance. However, if the third distance obtained based on the information on the third distance is 3 m, the third distance obtained based on the information on the third distance is not included in between 9 m to 11 m, which is the range of the third distance 30 calculated based on the information on the first distance and the information on the second distance. Accordingly, in this case, the processor 130 may identify that there is spoofing of location information by at least one of the first external device and the second external device.

A process of identifying whether there is spoofing of location information based on information on the distance between the electronic apparatus 100, the first external device, and the second external device will be described in more detail with reference to FIGS. 4A and 4B.

Meanwhile, a process of detecting spoofing of location information based on information on the first distance, information on the second distance, and information on the third distance has been described above. According to an embodiment, the processor 130 may acquire information on an absolute location or relative location of the first external device and the second external device, and acquire at least one of information on the first distance, information on the second distance, and information on the third distance based thereon to perform the detection process as described above.

Meanwhile, the processor 130 may store information on the first distance, information on the second distance, information on the third distance, information on the absolute or relative location of the first external device and the second external device, information on an external device specified as a subject of spoofing of location information, or the like in the memory 120, and further increase a detection rate of the spoofing of location information based on the stored information. For example, when the first external device is specified as the subject of spoofing of location information through the detection method described above, the processor 130 may store identification information on the first external device in the memory 120, and when a communication connection request is received from the first external device, may not accept the communication connection with the first external device based on the identification information stored in the memory 120 without confirming the device range and/or position using the above-described the detection process.

According to the method of detecting as described above, the processor 130 may identify that there is spoofing of location information by at least one of the first external device and the second external device, but may be difficult to clearly specify an attacker who spoofs location information among the first external device and the second external device.

Accordingly, the processor 130 may identify an external device which was previously registered as a trusted device among the first external device and the second external device, perform the location spoofing detection method based on the information on the third distance received from the trusted device, further perform the detection method in relation to external devices other than the first external device and the second external device, identify an external device in which a distance change is equal to or greater than a predetermined threshold value among the first and second external devices, and specify an attacker who spoofs location information among the first and second external devices to increase a detection rate of spoofing of location information. Hereinafter, various embodiments for increasing the detection rate of spoofing of location information will be described.

First, the processor 130 may increase the detection rate of spoofing of location information by identifying whether the external device is a pre-registered external device based on the identification information stored in the memory 120.

Specifically, the processor 130 may store identification information on a plurality of external devices in the memory 120 and identify whether the plurality of external devices are pre-registered external devices based on the identification information. The pre-registered external device may include an external device pre-registered as a trusted device by an user and an external device in which a certificate issued through a publicly trusted certificate authority.

For example, if it is identified that there is spoofing of location information by at least one of the first external device and the second external device, the processor 130 may identify whether there is a pre-registered device among the first external device and the second external device based on the identification information previously stored in the memory 120. If the second external device among the first external device and the second external device is identified as the pre-registered external device, the electronic apparatus 100 may specify the first external device as a subject of spoofing of location information.

Second, the processor 130 may perform the detection method described above based on the information on the third distance received from the first external device and the information on the third distance received from the second external device, thereby increasing the detection rate of spoofing of location information.

According to embodiments, it may be assumed that the information on the third distance is received from one of the first external device and the second external device, but the information on the third distance received from both of the first external device and the second external device corresponds to each other. The information on the third distance received from the first external device and the second external device correspond to each other means that the information on the third distance received from the first external device and the second external device coincides with each other, and even if the information does not match, its difference is less than the predetermined threshold value and does not affect the detection of spoofing of location information.

However, if the information on the third distance received from the first external device and the second external device do not correspond to each other, an attacker may manipulate the information on the third distance and transmit through at least one of the first external device and the second external device. Accordingly, if the information on the third distance received from both the first external device and the second external device do not correspond to each other, the processor 130 may perform the detection method on the information on the third distance received from the first external device and the second external device, respectively, as described above.

If the result of the location spoofing detection method based on the information on the third distance received from the first external device, and the result of the location spoofing detection method based on the information on the third distance received from the second external device are different, the processor 130 may specify a subject of spoofing of location information among the first external device and the second external device.

For example, as a result of performing the location spoofing detection method based on information on the third distance received from the first external device, if it is not identified that spoofing of location information by at least one of the first external device and the second external device exists, but is identified that spoofing of location information by at least one of the first external device and the second external device exists as a result of performing the detection method described above based on the information on the third distance received from the second external device, the processor 130 may specify the first external device as the subject of spoofing of location information.

It has been described above that the result of performing the location spoofing detection method based on the information on the third distance received from the first external device, and the result of performing the location spoofing detection method based on the information on the third distance received from the second external device do not match. However, if the detection results match, the processor 130 may identify that the spoofing of location information by at least one of the first external device and the second external device exists or does not exist depending on the result of matching.

Third, the processor 130 may increase the detection rate of spoofing of location information by additionally performing the location spoofing detection method in relation to external devices other than the first external device and the second external device.

Specifically, the processor 130 may receive a third beacon signal from a third external device, and obtain information on a fourth distance between the electronic apparatus 100 and the third external device based on the received third beacon signal. In addition, the processor 130 may receive information on a fifth distance between the first external device and the third external device from at least one of the first external device and the third external device. When information on a first distance, information on a fourth distance, and information on a fifth distance are obtained, the processor 130 may identify whether location information is spoofed by at least one of the first external device and the third external device based on information on the first distance, information on the fourth distance, and information on the fifth distance.

In particular, if the fifth distance is identified to be smaller than a difference between the first distance and the fourth distance, or greater than a sum of the first distance and the fourth distance, based on the information on the first distance, the information on the fourth distance, and the information on the fifth distance, the processor may identify that spoofing of location information by at least one of the first external device and the third external device exists. In this case, as described above, if is identified that the spoofing of location information by at least one of the first external device and the second external device exists based on information on the first distance and information on the second distance, the processor 130 may specify the first external device as a subject of spoofing of location information.

As described above, a method of increasing the detection rate of spoofing of location information by additionally performing the location spoofing detection method in relation to the third external device other than the first external device the second external device has been described. However, if the detection method according to the disclosure is additionally performed in relation to more external devices, the detection rate of spoofing of location information may be further increased.

Fourth, the processor 130 may increase the detection rate of spoofing of location information by identifying an external device having a distance change equal to or greater than a preset threshold value.

Specifically, the processor 130 may repeatedly receive a beacon signal from an external device at a predetermined time interval. The processor 130 may obtain information on a distance between the electronic apparatus 100 and the external device based on each of the repeatedly received beacon signals. Further, the processor 130 may identify a change in the distance of the external device based on information on the distance of the external device according to the lapse of time when the beacon signal is received.

For example, when information on the first distance between the electronic apparatus 100 and the first external device is obtained based on a first beacon signal, the processor 130 may store the obtained information on the first distance in the memory 120. In addition, when the fourth beacon signal is received from the first external device after the first beacon signal is received, the processor 130 may obtain information on a sixth distance between the electronic apparatus 100 and the first external device based on the fourth beacon signal.

The fourth beacon signal is distinguished from the second beacon signal received from the second external device and the third beacon signal received from the third external device. In addition, the fourth beacon signal is the same as the first beacon signal in that it is a beacon signal received from the first external device, but is referred to as a different term to clearly specify that it is an additional beacon signal received after the first beacon signal is received. Meanwhile, the information on the sixth distance may be the same as the information on the first distance in terms of information on the distance between the electronic apparatus 100 and the first external device, but may be different from information on the first distance obtained based on a time point at which the first beacon signal is received in that it is information on the distance obtained based on a time point at which the fourth beacon signal is received.

When information on the sixth distance is obtained, the processor 130 may identify a change in the distance between the electronic apparatus 100 and the first external device based on the information on the first distance and the information on the sixth distance. In addition, when the identified distance change is equal to or greater than a predetermined threshold value, the processor 130 may specify the first external device as a subject of spoofing of location information. The predetermined threshold value may be determined in terms of whether a distance change of the first external device exceeds a normal range compared to the lapse of time from the time when the first beacon signal is received to the time when the fourth beacon signal is received. In addition, the predetermined threshold value may be set by the user of the electronic apparatus 100, and may be determined based on information on the distance between the electronic apparatus 100 and the first external device previously stored in the memory 120 for a specific period or longer.

For example, the lapse of time from a time point when the first beacon signal is received to a time point when the fourth beacon signal is received may be 0.1 seconds, and the first distance and the fourth distance may be 5 m and 1 m, respectively, according to the information on the first distance obtained based on the first beacon signal and the fourth distance obtained based on the fourth beacon signal. In this case, the electronic apparatus 100 may identify that a distance change between the electronic apparatus 100 and the first external device for 0.1 second is 4 m. If the identified distance change, 4 m, is equal to or greater than the predetermined threshold value, the electronic apparatus 100 may specify the first external device as a subject of spoofing of location information. In other words, moving 4 m for 0.1 second exceeds the normal range, and it may be identified that an attacker spoofs location information with a method of manipulating the transmission timing of the fourth beacon signal of the first external device.

In the above, the method of increasing the detection rate of the spoofing of location information by identifying whether the distance change of the first external device is equal to or greater than the predetermined threshold value has been described based on the first beacon signal received from the first external device and the fourth beacon signal received after the first beacon signal is received, but the detection rate of spoofing of location information may be further increased by determining whether the distance change of the first external device is equal to or greater than the predetermined threshold value based on additional beacon signals received from the first external device.

According to various embodiments of the disclosure, the electronic apparatus 100 may effectively detect spoofing of location information based on information received from a plurality of external devices located near the electronic apparatus.

In other words, the electronic apparatus 100 may effectively detect spoofing of location information by verifying whether an attacker's external device correctly transmits a beacon signal using another external device near the attacker's external device. In addition, the electronic apparatus 100 may increase the detection rate of spoofing of location information based on identification information previously stored in a memory, information on distance changes of external devices, information on distances between devices, or the like.

Figure 3A:
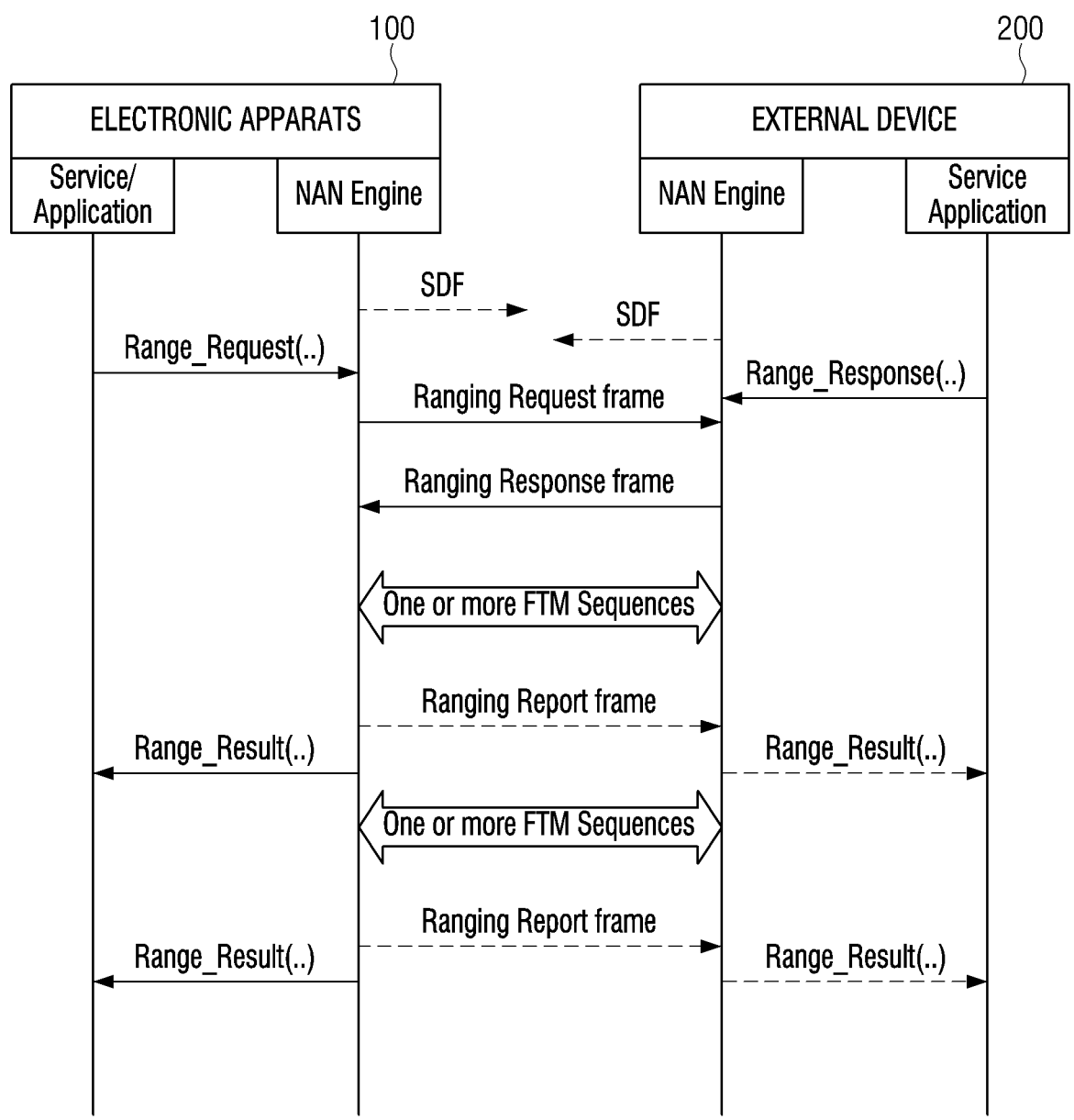
FIGS. 3A and 3B are views illustrating a method of acquiring information on a distance between an electronic apparatus and a plurality of external devices based on a beacon signal, according to an embodiment of the disclosure.
Figure 3B:
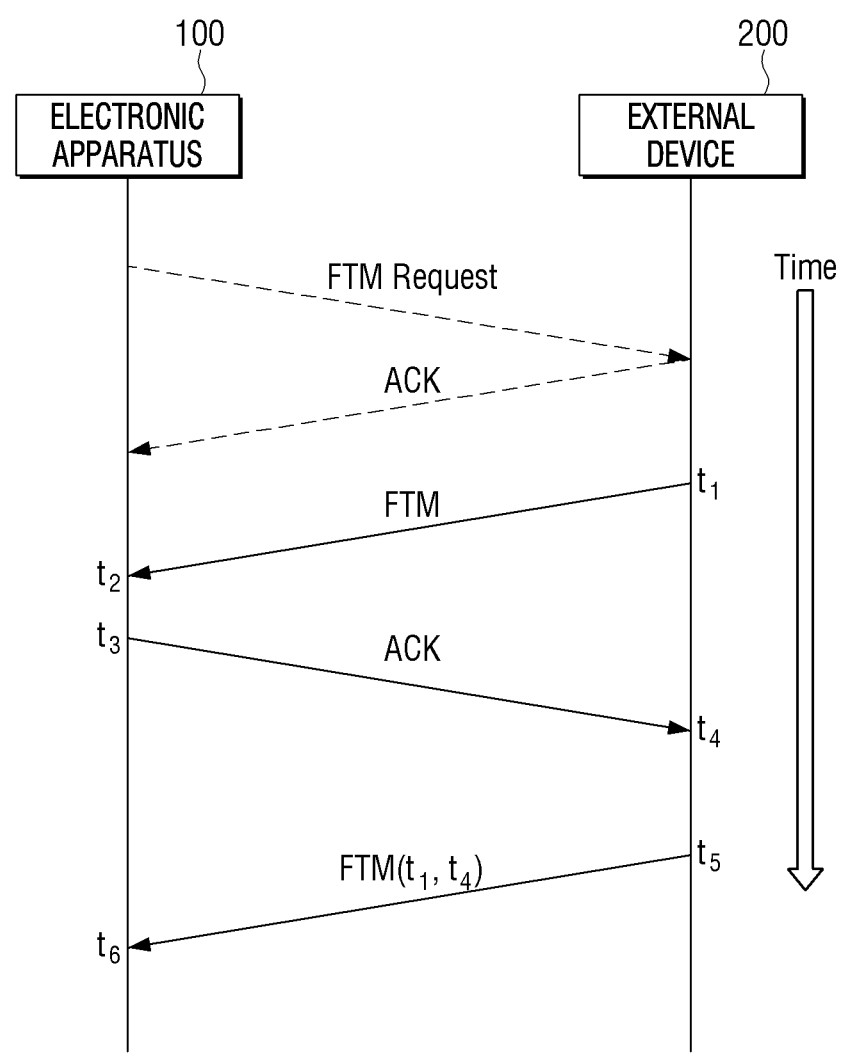

FIGS. 3A and 3B are views illustrating a method of acquiring information on a distance between an electronic apparatus and a plurality of external devices based on a beacon signal, according to an embodiment.

As described above, the electronic apparatus 100 and the external device 200 may correspond to a NAN terminal constituting a neighbor awareness network (NAN). The NAN terminal may operate based on an IEEE 802.11 physical layer. The NAN terminal may include a NAN medium access control (MAC) layer, a NAN discovery engine, a ranging engine, and NAN APIs of each application (application 1, application 2 to application N) as major components. In addition, the electronic apparatus 100 and the external device 200 corresponding to the NAN terminal may perform the ranging operation to obtain information on a distance between each other.

FIG. 3A is a view illustrating a process of performing the ranging operation according to an embodiment of the disclosure. Referring to FIG. 3A, the electronic apparatus 100 and the external device 200 may exchange service discovery frames (SDF) to perform the ranging operation. The service discovery frame may include a publish, a subscribe message, a ranging setting information, or the like.

In addition, a service/application of the electronic apparatus 100 may call a ranging request method to the NAN engine. The ranging request method may include at least one of address information (MAC Address), ranging ID information, and configuration parameter. The configuration parameter may include a ranging resolution with respect to an accuracy of the ranging, a ranging indication condition for instructing a report of a result of the ranging operation based on a moving range of the NAN terminal.

After calling the ranging request method, the electronic apparatus 100 may transmit a ranging request frame including attribute information on the ranging to the external device 200.

Meanwhile, the service/application of the external device 200 may call a ranging response method to the NAN engine. The ranging response method may include parameter information indicating whether to automatically respond, and configuration information similar to the ranging request method. In addition, the external device 200 may transmit a ranging response frame including ranging setting information to the electronic apparatus 100 based on the ranging request method.

Thereafter, the electronic apparatus 100 and the external device 200 may perform a fine time measurement exchange at least one time to obtain information on the distance between the electronic apparatus 100 and the external device 200. The FTM signal and the ACK signal corresponding thereto as shown in FIG. 3B may be a beacon signal according to the disclosure, but will be separately described below to more clearly specify the relationship between a transmission of each signal and the response according thereto.

FIG. 3B is a view illustrating a process of obtaining distance information using an FTM protocol. Referring to FIG. 3B, the electronic apparatus 100 may transmit an FTM request signal to the external device 200, and the external device 200 may transmit an acknowledgment (ACK) signal corresponding to the FTM request signal to the electronic apparatus 100. Thereafter, the external device 200 may transmit a first FTM signal to the electronic apparatus 100 at a first time $t_1$, and the electronic apparatus 100 may receive the first FTM signal from the external device 200 at a second time $t_2$. Then, the electronic apparatus 100 may transmit the ACK signal corresponding to the FTM signal to the external apparatus 200 at a third time $t_3$, the external device 200 may receive the ACK signal corresponding to the first FTM signal at a fourth time $t_4$. Thereafter, the external device 200 may transmit the second FTM signal to the electronic apparatus 100 at a fifth time $t_5$ and the electronic apparatus 100 may transmit the second FTM signal at a sixth time $t_6$.

Meanwhile, as shown in FIG. 3B, the second FTM signal may include information on the first time $t_1$ and the fourth time $t_4$, and thus the electronic apparatus 100 may obtain information on time stamps at the sixth time $t_6$, that is, the first time $t_1$, the second time $t_2$, the third time $t_3$, and the fourth time $t_4$. A round-trip time (RTT) of the first FTM signal is a time obtained by subtracting the first time $t_1$ from the fourth time $t_4$, and a delayed time in the third time $t_3$ at which the ACK signal corresponding to the first FTM is transmitted after the electronic apparatus 100 receives the first FTM in the second time $t_2$ is obtained by subtracting the second time $t_2$ from the third time $t_3$. Therefore, a distance between the electronic apparatus 100 and the external device 200 may be calculated by multiplying an average flight time $((t_4-t_1+t_2-t_3)/2$ sec) of the first FTM and the ACK signal corresponding thereof by $(3\times10^8)$ m/sec.

It has been described that the electronic apparatus 100 obtains four timestamps by receiving the second FTM signal including information on the first time $t_1$ to the fourth time $t_4$ at the sixth time $t_6$ for obtaining information on a distance between the electronic apparatus 100 and the external device 200, but the disclosure is not limited thereto.

Specifically, before the beacon signal is received from the external device 200, the electronic apparatus 100 may synchronize internal times of the electronic apparatus 100 and the external device 200, and receive information on the time that the external device 200 transmits the beacon signal. Thereafter, when the beacon signal is received from the first external device 200, the electronic apparatus 100 may obtain information on the distance between the electronic apparatus 100 and the external apparats 200 based on information on time when the electronic apparatus 200 transmits the beacon signal and information on which the beacon signal is received from the first external device 200.

It has been described that the method of obtaining information on the distance between the electronic apparatus 100 and the external device 200 using the FTM protocol, but the disclosure is not limited thereto, and various methods for obtaining information on a distance between devices may be applied within the scope of the purpose of the disclosure.

Hereinbelow, various embodiments for detecting spoofing of location information will be described on the assumption that information on the distance between the electronic apparatus 100 and the external device 200, and information on the distance between the plurality of external devices 200 may be obtained.

Figure 4A:
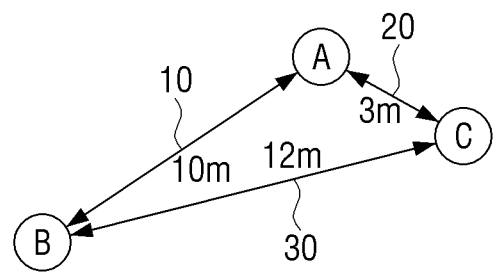
FIGS. 4A and 4B are views illustrating a process of identifying whether location information is spoofed based on information on a distance between an electronic apparatus, a first external device, and a second external device, according to an embodiment of the disclosure.
Figure 4B:
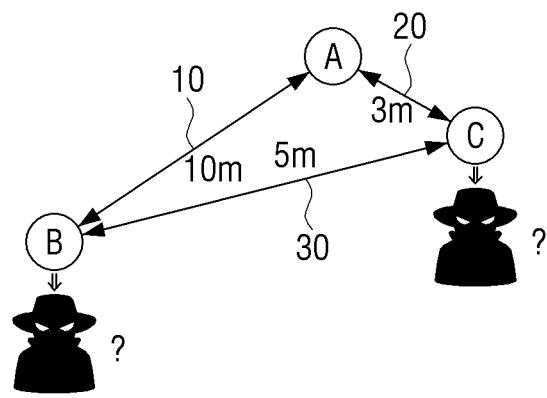

FIGS. 4A and 4B are views illustrating a process of identifying whether location information is spoofed based on information on a distance between an electronic apparatus A, a first external device B, and a second external device C, according to an embodiment.

Hereinafter, in describing FIGS. 4A, 4B, and 5, for convenience of description, symbols such as A, B, C, and D are used to specify a first external device, a second external device, a third external device, or the like, respectively.

The electronic apparatus A according to the disclosure may identify whether location information is spoofed by at least one of the first external device B and the second external device C based on information on the first distance 10, information on the second distance 20, and information on the third distance 30.

Specifically, if it is identified that there is an incongruity between the first distance 10, the second distance 20, and the third distance 30 obtained based on information on the first distance 10, information on the second distance 20, and information on the third distance 30, the electronic apparatus A may identify that spoofing of location information by at least one of the first external device B and the second external device C exists.

For example, the electronic apparatus A may identify that a first distance 10 between the electronic apparatus A and the first external device B is 10 m based on the information on the first distance 10, and identify that the second distance 20 between the electronic apparatus A and the second external device B is 3 m based on the information on the second distance 20. When it is identified that the first distance 10 is 10 m and the second distance 20 is 3 m, the third distance 30 between the first external device B and the second external device C may be within a range from 7 m corresponding to a difference between the first distance 10 and the second distance 20 to 13 m corresponding to a sum of the first distance 10 and the second distance 20.

In this case, as shown in FIG. 4A, if the third distance 30 obtained based on the information on the third distance 30 is 12 m, the third distance 30 obtained based on the information on the third distance 30 is included in a range of 7 m to 13 m, which is the range of the third distance 30 calculated based on the information on the first distance 10 and the second distance 30. Accordingly, in this case, the electronic apparatus A may identify that spoofing of location information by at least one of the first external device B and the second external device C does not exist.

Meanwhile, as shown in FIG. 4B, if the third distance 30 obtained based on the information on the third distance 30 is 5 m, the third distance 30 obtained based on the information on the third distance 30 is not included in the range of 7 m to 13 m, which is the range of the third distance 30 calculated based on the information on the first distance 10 and the information on the second distance 20. Accordingly, in this case, the electronic apparatus A may identify that the spoofing of location information by at least one of the first external device B and the second external device C exists.

In other words, if the third distance 30 obtained based on the information on the third distance 30 is not included in the range of the third distance 30 calculated based on the information on the first distance 10 and the information on the second distance 20, the electronic apparatus A may identify that the spoofing of location information by at least one of the first external device B and the second external device C exists.

Figure 5:
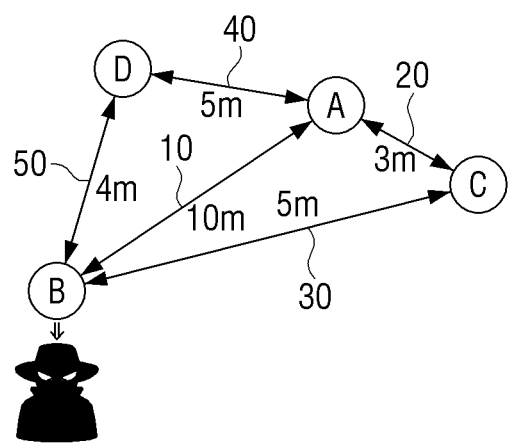
FIG. 5 is a view illustrating a process of specifying a subject of spoofing location information by additionally performing a method of detecting, according to an embodiment of the disclosure, in relation to external devices other than a first external device and a second external device.

FIG. 5 is a view illustrating a process of specifying a subject of spoofing location information by additionally performing a method of detecting, according to the disclosure, in relation to external devices other than the first external device B and the second external device C.

In the description of FIG. 5, as described above with reference to FIG. 4B, it is assumed that spoofing of location information by at least one of the first external device B and the second external device C exists, and an embodiment of additionally performing the detection method according to the disclosure in relation to the third external device D will be described.

The electronic apparatus A according to the disclosure may receive a third beacon signal from the third external device D, and obtain information on a fourth distance 40 between the electronic apparatus A and the third external device D based on the received third beacon signal. In addition, the electronic apparatus A may receive information on a fifth distance 50 between the first external device B and the third external device D from at least one of the first external device B and the third external device D. When information on the first distance 10, information on the fourth distance 40, and information on the fifth distance 50 are obtained, the electronic apparatus A may identify whether location information is spoofed by at least one of the first external device B and the third external device D based on the information on the first distance 10, the information on the fourth distance 40, and the information on the fifth distance 50.

In particular, if it is identified that the fifth distance 50 is less than the difference between the first distance 10 and the fourth distance 40, or greater than the sum of the first distance 10 and the fourth distance 40, based on the information on the first distance 10, the information on the fourth distance 40, and the information on the fifth distance 50, the electronic apparatus A may identify the spoofing of location information by at least one of the first external device B and the third external device D exists.

For example, as shown in FIG. 5, the electronic apparatus A may identify the first distance 10 between the electronic apparatus A and the first external device B is 10 m based on the information on the first distance 10, and may identify that the fourth distance 40 between the electronic apparatus A and the third external device D is 5 m based on the information on the fourth distance 40. When it is identified that the first distance 10 is 10 m and the fourth distance 40 is 5 m, the fifth distance 50 between the first external device B and the third external device D may be included in a range from 5 m corresponding to the difference between the first distance 10 and the fourth distance 40 to 15 m corresponding to the sum of the first distance 10 and the fourth distance 40.

However, as shown in FIG. 5, if the fifth distance 50 obtained based on the information on the fifth distance 50 is 4 m, the fifth distance 50 obtained based on the information on the fifth distance 50 is not within the range of 5 m to 15 m calculated based on the information on the information on the first distance 10 and the information on the fourth distance 40. Accordingly, the electronic apparatus A may identify that the spoofing of location information by at least one of the first external device B and the third external device D exists.

Consequently, according to the embodiment of the disclosure described with reference to FIG. 5, because there is spoofing of location information by at least one of the first external device B and the second external device C, and at the same time, it is identified that there is spoofing of location information by at least one of the first external device B and the third external device D, the location information may be highly likely to be spoofed by the first external device B. Accordingly, in this case, the electronic apparatus A may specify the first external device B as a subject of spoofing of location information.

In the above, a method of increasing the detection rate of spoofing of location information by additionally performing the detection method described above in relation to the third external device Dis described, but if the detection method according to the disclosure is additionally performed in relation to more external devices, the detection rate of spoofing of location information may be improved.

Figure 6:
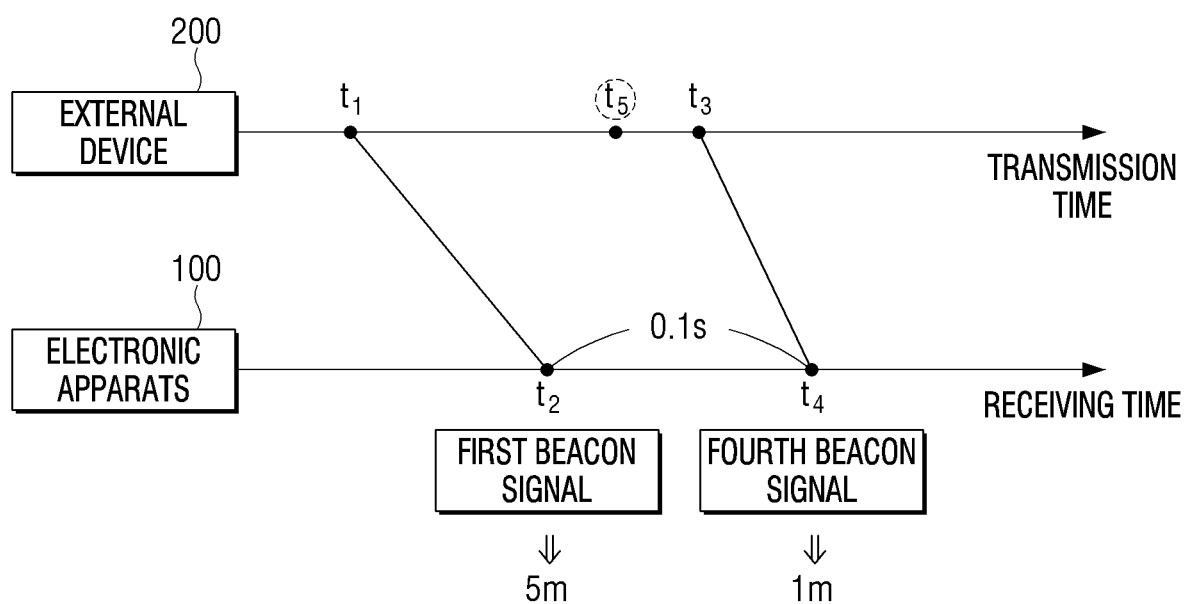
FIG. 6 is a view illustrating a process of specifying a subject of spoofing location information by identifying an external device having a distance change equal to or greater than a predetermined threshold value among first and second external devices, according to an embodiment of the disclosure.

FIG. 6 is a view illustrating a process of specifying a subject of spoofing location information by identifying an external device having a distance change equal to or greater than a predetermined threshold value among first and second external devices.

In the description of FIG. 6 similar to the description of FIG. 5, as described above with reference to FIG. 4B, it is assumed that the spoofing of location information by at least one of the first external device 200 and the second external device 200 exists, and an embodiment related to identifying the external device 200 having a distance change equal to or greater than a predetermined threshold value, among the first external device 200 and the second external device 200, will be described.

FIG. 6 illustrates a time when the external device 200 transmits a beacon signal and a time when the electronic apparatus 100 receives the beacon signal from the external device 200 based on each time axis. As described above, the external device 200 may repeatedly transmit beacon signals at predetermined time intervals, but only some of the signals are shown in FIG. 6. The first time $t_1$ and the third time $t_3$ in FIG. 6 are times when the external device 200 transmits the beacon signals, and the second time $t_2$ and the fourth time $t_4$ are times when the electronic apparatus 100 transmits beacon signals from the external device 200.

Meanwhile, as described above, the attacker may intentionally manipulate the time when the external device 200 transmits the beacon signal and transmit the beacon signal, thereby spoofing location information. The fifth time is of FIG. 6 is a predetermined time for the external device 200 to transmit a next beacon signal after transmitting the beacon signal at the first time $t_1$, and the third time $t_3$ refers to a time determined by the attacker as a time to intentionally transmit the beacon signal instead of the fifth time $t_5$.

Specifically, when the external device 200 transmits the first beacon signal at the first time $t_1$, the electronic apparatus 100 may receive the first beacon signal from the external device 200 at the second time $t_2$. Further, the electronic apparatus 100 may acquire information on the first distance between the electronic apparatus 100 and the external device 200 based on the first beacon signal, and store the obtained first distance information in a memory.

Meanwhile, the external device 200 may not transmit the beacon signal at the fifth time $t_5$, which is the predetermined time to transmit the next beacon signal after the first time $t_1$, and transmit the fourth beacon signal at the intentionally delayed third time $t_3$, and the electronic apparatus 100 may receive the fourth beacon signal from the external device 200 at the fourth time $t_4$. Further, the electronic apparatus 100 may obtain information on a sixth distance between the electronic apparatus 100 and the external device 200 based on the fourth beacon signal. The definitions of the information on the fourth beacon signal and the sixth distance have been described above with reference to FIG. 2.

When the information on the sixth distance is obtained, the electronic apparatus 100 may identify a distance change between the electronic apparatus 100 and the first external device 200 based on the information on the first distance and the information on the sixth distance. In addition, when the identified distance change is equal to or greater than the predetermined threshold value, the electronic apparatus 100 may specify the first external device 200 as a subject of spoofing location information. It has been described that the predetermined threshold value may be determined in terms of whether the distance change of the first external device 200 exceeds the normal range compared to the time lapse from the time when the first beacon signal is received to the time when the fourth beacon signal is received. In addition, the predetermined threshold value may be set by the user of the electronic apparatus 100, and may be determined based on information on a distance between the electronic apparatus 100 and the first external device 200 previously stored in the memory for a specific period or more.

For example, as illustrated in FIG. 6, the time lapse from the time when the first beacon signal is received to the time when the fourth beacon signal is received may be 0.1 seconds, and according to the first distance obtained based on the first beacon signal and the information on the fourth distance obtained based on the fourth beacon signal, the first distance and the fourth distance may be 5 m and 1 m, respectively. In this case, the electronic apparatus 100 may identify that a distance change between the electronic apparatus 100 and the first external device 200 for 0.1 second is 4 m. If the identified distance change of 4 m is equal to or greater than the predetermined threshold value, the electronic apparatus 100 may specify the first external device 200 as a subject of spoofing of location information. In other words, since moving 4 m for 0.1 seconds exceeds the normal range, it may be identified such anomaly is caused by spoofing the location information with a method of manipulating the transmission timing of the fourth beacon signal of the first external device 200, or the like.

Figure 7:
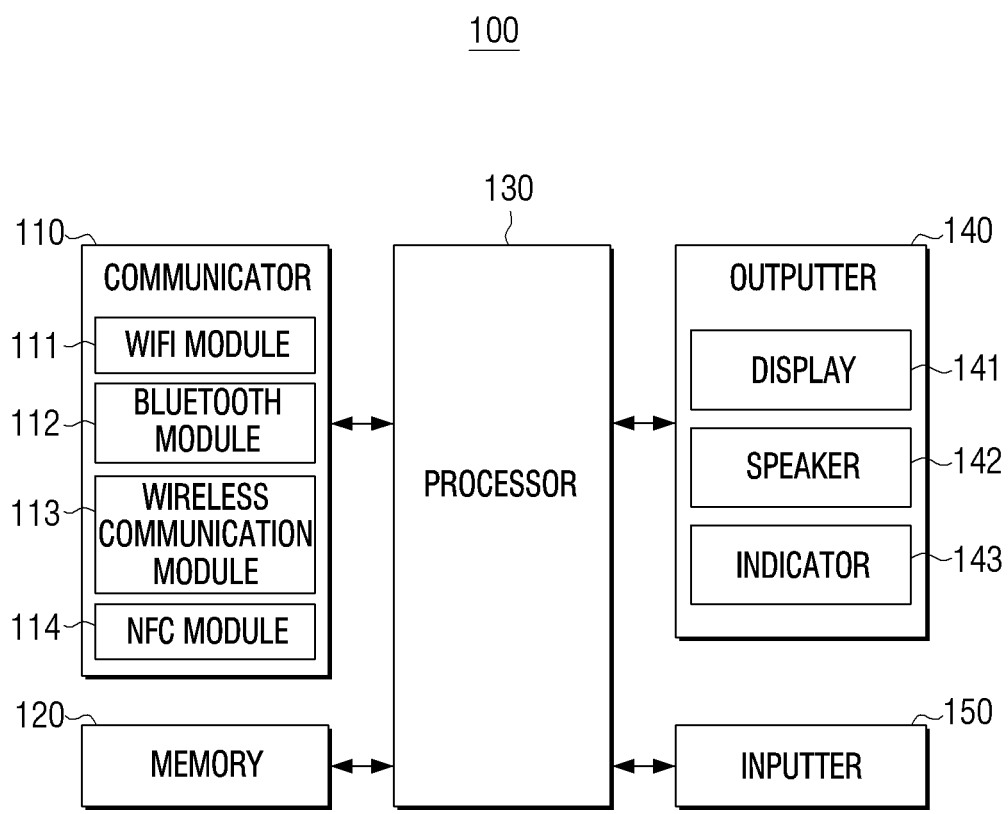
FIG. 7 is a diagram illustrating a configuration of an electronic apparatus according to an embodiment of the disclosure.
Figure 8:
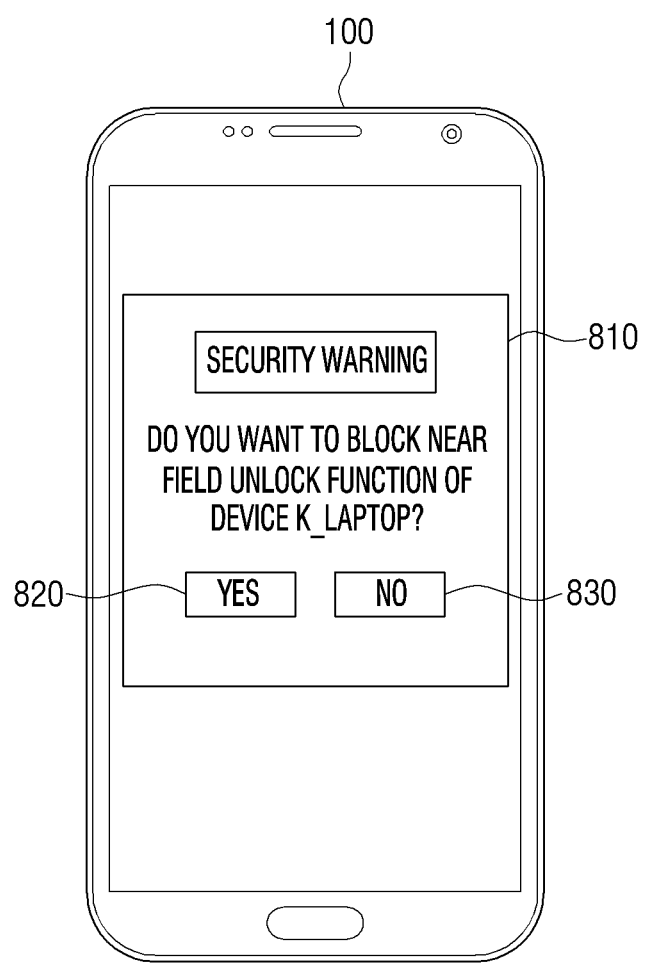
FIG. 8 is a view illustrating an example of a user interface including a notification on spoofing of location information, according to an embodiment of the disclosure.

FIG. 7 is a diagram illustrating a configuration of an electronic apparatus according to an embodiment of the disclosure, and FIG. 8 is a view illustrating an example of a user interface including a notification on spoofing of location information according to an embodiment of the disclosure.

Referring to FIG. 7, the electronic apparatus 100 may include a communicator 110, a memory 120, and a processor 130, and also an inputter 150 and an outputter 140. However, this configuration is exemplary, and other components may be added or some components may be omitted.

The communicator 110 may include at least one among Wi-Fi module 111, Bluetooth module 112, a wireless communication module 113, and near field communication (NFC) module 114. In particular, the Wi-Fi module 111 and the BT module 112 may communicate in the Wi-Fi method and the BT method, respectively. In the case in which the Wi-Fi module 111 or the Bluetooth module 112 is used, a variety of access information such as SSID, and the like may be first transmitted and received, a communication access may be performed using the variety of access information, and a variety of information may be then transmitted and received.

The wireless communication module 113 refers to a module that performs communication according to the various communication standards such as IEEE, Zigbee, 3rd Generation (3G), 3rd Generation Partnership Project (3GPP), Long Term Evolution (LTE), 5th generation (5G), and so on. The NFC module 114 may be a module operated in the NFC scheme that uses a frequency band of 13.56 MHz among various RF-ID frequency bands such as 135 kHz, 13.56 MHz, 433 MHz, 860 to 960 MHz, 2.45 GHz, and the like.

In particular, in various embodiments according to the disclosure, the communicator 110 may receive beacon signals from a plurality of external devices through the Wi-Fi module 111, and receive information on distances between the plurality of external devices. In addition, the communicator 100 may transmit beacon signals to the external device through the Wi-Fi module 111 under the control of the processor 130. However, the disclosure is not limited thereto, and various signals and information according to the disclosure may be transmitted and received to an external device through various modules 111, 112, 113 and 114 included in the communicator 110.

The outputter 140 includes a circuit, and the processor 130 may output various functions that can be performed by the electronic apparatus 100 through the outputter 140. In addition, the outputter 140 may include at least one of a display 141, a speaker 142, and an indicator 143.

The display 141 may output various image data under the control of the processor 130. The display 141 may output the image stored in the storage 120 under control of the processor 130. In particular, the display 141 according to an embodiment of the disclosure may display a user interface (UI) stored in the memory 120.

The display 141 may be implemented as liquid crystal display panel (LCD), organic light emitting diodes (OLED), or the like, also may be implemented as a flexible display, a transparent display, or the like in some cases, the display 141. However, the display 141 according to the disclosure is not limited to a specific type.

The speaker 142 may output audio data under the control of the processor 130, and the indicator 143 may be turned on under the control of the processor 130.

In various embodiments of the disclosure, if it is identified that there is spoofing of location information by at least one external device, the processor 130 may provide a notification about spoofing of location information through the outputter 140. Specifically, the processor 130 may control the display 141 to display a UI including a notification on spoofing of location information, output a warning voice through the speaker 142, or turn on the indicator 143, to provide the notification about spoofing of location information.

For example, the processor 130 may provide a notification about spoofing of location information through the user interface (UI) 810 as illustrated in FIG. 8. In other words, the processor 130 may control the display 141 to display the UI 810 including a message such as "security warning" and "Do you want to block a short-range unlock function of device K LAPTOP?."

The inputter 150 includes a circuit, and the processor 130 may receive a user command for controlling the operation of the electronic apparatus 100 through the inputter 150. Specifically, the inputter 150 may be configured with a microphone, a camera, a remote control signal receiving unit, or the like. In addition, the inputter 150 may be implemented in a form included in a display as a touch screen.

In various embodiments of the disclosure, the inputter 150 may receive a user command for establishing or terminating a communication access with at least one external device, and a user command for performing a method for detecting spoofing of location information according to the disclosure, and when it is identified that there is spoofing of location information, various types of user notifications for coping with spoofing of location information may be included.

In particular, as described above, when the notification about spoofing of location information is provided through the UI 810, the user of the electronic apparatus 100 may recognize that spoofing of location information has occurred. Accordingly, the user may guard against spoofing of location information by inputting a user command through the inputter 150. For example, when the notification about spoofing of location information is provided, the user may select "Yes 820" among selection commands "Yes 820" and "No 830" included in the UI 810 to block the short-range unlock function of the electronic apparatus 100, and may prevent an attacker from stealing personal information of the user included in the electronic apparatus 100.

Meanwhile, in the above, the embodiment of providing notification about spoofing of location information through the outputter 140 has been described, but the processor 130 may transmit the notification about the spoofing of location information to a pre-registered user terminal through the communicator 110. In addition, if spoofing of location information by at least one external device exists, the processor 130 may block the short-range unlock function of the electronic apparatus 100.

Figure 9:
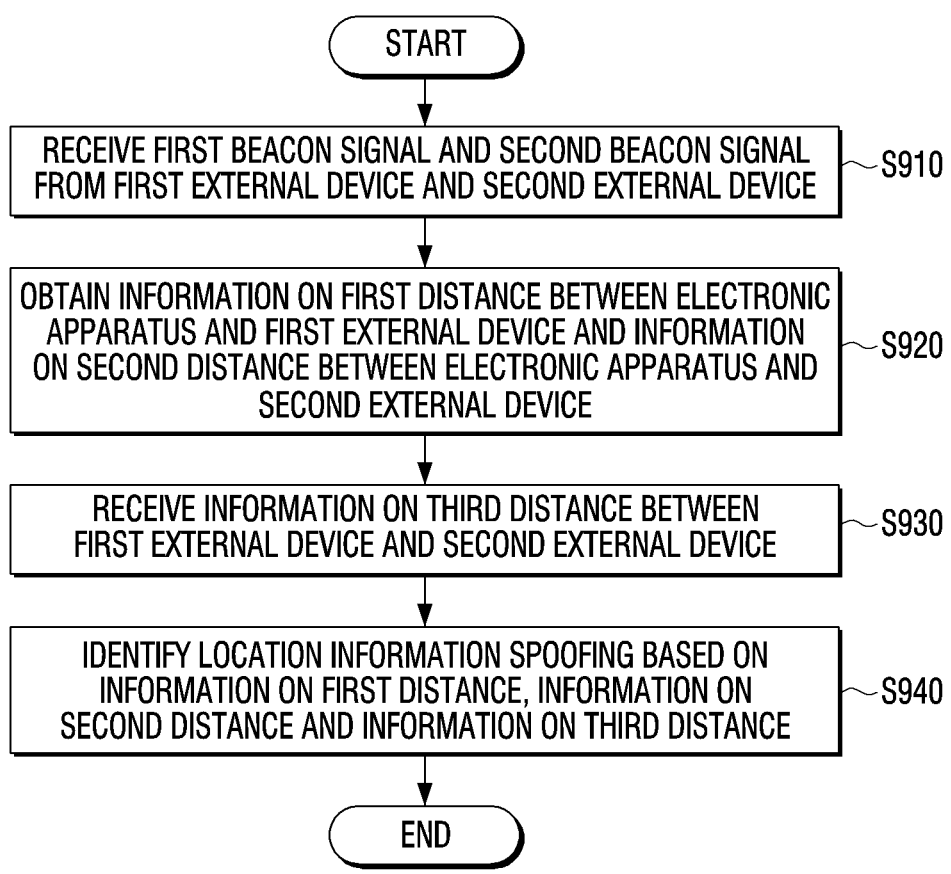
FIG. 9 is a flowchart illustrating a method of controlling an electronic apparatus according to an embodiment of the disclosure.

FIG. 9 is a flowchart illustrating a method of controlling an electronic apparatus according to an embodiment of the disclosure.

As illustrated in FIG. 9, the electronic apparatus 100 according to an embodiment of the disclosure may receive a first beacon signal and a second beacon signal from a first external device and a second external device, respectively (S910). The beacon signal according to the disclosure has been described above with reference to FIG. 1.

When the first beacon signal and the second beacon signal are received from the first external device and the second external device, respectively, the electronic apparatus 100 may obtain information on a first distance between the electronic apparatus 100 and the first external device, and information on a second distance between the electronic apparatus 100 and the second external device (S920). In particular, the electronic apparatus 100 may obtain information on the first distance and information on the second distance using a fine time measurement (FTM) protocol, as described above with reference to FIGS. 3A and 3B.

Meanwhile, the electronic apparatus 100 may receive information on a third distance between the first external device and the second external device from at least one of the first external device and the second external device (S930). The information on the third distance between the first external device and the second external device may be selectively included in a frame of the beacon signal, but may be transmitted to the electronic apparatus 100 from the first external device and the second external device through a separate protocol.

The electronic apparatus 100 may identify whether location information is spoofed by at least one of the first external device and the second external device based on the information on the first distance, the information on the second distance, and the information on the third distance (S940). Specifically, if the electronic apparatus 100 identifies that there is a anomaly with respect to the first distance, the second distance, and the third distance obtained based on information on the first distance, information on the second distance, and information on the third distance, respectively, the electronic apparatus 100 may identify that there is spoofing of location information by at least one of the first external device and the second external device.

Since various embodiments related to each step of the method of controlling the electronic apparatus 100 according to the disclosure have been described above with reference to FIGS. 1 to 8, redundant descriptions will be omitted.

Meanwhile, the method of controlling the electronic apparatus 100 according to the embodiment described above may be implemented as a program and provided to the electronic apparatus 100. In particular, the program including a method for controlling an electronic apparatus according to exemplary embodiments may be stored in a non-transitory computer readable medium and provided therein.

Specifically, as for the computer-readable recording medium including a program for executing the method of the electronic apparatus 100, the method of controlling the electronic apparatus 100 includes receiving the first beacon signal and the second beacon signal from the first external device and the second external device, respectively, obtaining information on the first distance between the electronic apparatus 100 and the first external device and information on the second distance between the electronic apparatus 100 and the second external device based on each of the first beacon signal and the second beacon signal, receiving information on the third distance between the first external device and the second external device, and identifying whether location information is spoofed by at least one of the first external device and the second external device based on the information on the first distance, information on the second distance, and information on the third distance.

The non-transitory computer readable recording medium indicates a medium which stores data semi-permanently and can be read by devices, rather than a medium storing data temporarily, such as register, cache, or memory. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

In the above, the control method of the electronic apparatus 100 and the computer-readable recording medium including the program for executing the control method of the electronic apparatus 100 have been briefly described, but this is only for omitting redundant descriptions, and various embodiments of the electronic apparatus 100 may be applied to the method of controlling the electronic apparatus 100 and the computer-readable recording medium including the program for executing the method of controlling the electronic apparatus 100.

According to various embodiments of the disclosure as described above with reference to FIGS. 1 to 9, the electronic apparatus 100 may effectively detect spoofing of location information based on information received from a plurality of external devices at a distance nearby to the electronic apparatus 100.

Each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration.

Operations performed by a module, a program module, or other component, according to various exemplary embodiments, may be sequential, parallel, or both, executed iteratively or heuristically, or at least some operations may be performed in a different order, omitted, or other operations may be added.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be composed of application-specific integrated circuit (ASIC).

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions.

When the instructions are executed by a processor, the processor may directory perform functions corresponding to the instructions using other components or the functions may be performed under a control of the processor. The instructions may include code generated or executed by a compiler or an interpreter.

The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer.

The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

While the disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a communicator;
a memory storing at least one instruction; and
a processor configured to execute the stored at least one instruction to:
receive, through the communicator, a first beacon signal from a first external device and a second beacon signal from a second external device,
based on the received first beacon signal, obtain first information indicating a first distance between the electronic apparatus and the first external device,
based on the received second beacon signal, obtain second information indicating a second distance between the electronic apparatus and the second external device,
receive, through the communicator, third information indicating a third distance between the first external device and the second external device, from at least one of the first external device or the second external device, and
identify whether the first beacon signal from the first external device is invalid, based on the first distance, the second distance, and the third distance, and
identify whether the first distance between the electronic apparatus and the first external device is invalid, based on the first distance, the second distance, and the third distance.

2. The electronic apparatus of claim 1, wherein the processor is further configured to execute the stored at least one instruction to, based on the third distance being less than a difference between the first distance and the second distance, or based on the third distance being greater than a sum of the first distance and the second distance, identify that the first external device spoofs an actual location of the first external device relative to the electronic apparatus.

3. The electronic apparatus of claim 2, wherein the processor is further configured to execute the stored at least one instruction to, based on the second external device being a trusted device, identify that the first external device spoofs the actual location of the first external device relative to the electronic apparatus.

4. The electronic apparatus of claim 2, wherein the processor is further configured to execute the stored at least one instruction to:
receive the third information from both the first external device and the second external device, through the communicator.

5. The electronic apparatus of claim 2, wherein the processor is further configured to execute the stored at least one instruction to:
- receive a third beacon signal from a third external device through the communicator,
- obtain fourth information indicating a fourth distance between the electronic apparatus and the third external device based on the third beacon signal,
- receive fifth information indicating a fifth distance between the first external device and the third external device from at least one of the first external device or the third external device through the communicator, and
- based on the fifth distance being less than a difference between the first distance and the fourth distance, or the fifth distance being greater than a sum of the first distance and the fourth distance, identify that the first external device spoofs the actual location of the first external device relative to the electronic apparatus.

6. The electronic apparatus of claim 1, wherein the processor is further configured to execute the stored at least one instruction to:
- synchronize an internal time of the electronic apparatus and an internal time of the first external device through the communicator,
- receive timing information on a time that the first external device transmits the first beacon signal through the communicator, and
- based on the first beacon signal being received from the first external device through the communicator, obtain the first information, based on the timing information.

7. The electronic apparatus of claim 5, wherein the processor is further configured to execute the stored at least one instruction to:
- store the first distance in the memory,
- obtain sixth information indicating a sixth distance between the electronic apparatus and the first external device based on the third beacon signal,
- identify a distance change between the electronic apparatus and the first external device based on the first information and the sixth information, and
- based on the distance change being equal to or greater than a predetermined threshold value, identify that the first external device spoofs the actual location of the first external device relative to the electronic apparatus.

8. The electronic apparatus of claim 1, wherein the third information is included in at least one of the first beacon signal or the second beacon signal.

9. The electronic apparatus of claim 1, further comprising a display,
- wherein the processor executing the stored at least one instruction is configured to, based on identifying that the first external device spoofs an actual location of the first external device relative to the electronic apparatus, control the display to provide a notification indicating that the first external device spoofs the actual location of the first external device relative to the electronic apparatus.

10. A method of an electronic apparatus determining whether an external device spoofs a location thereof, the method comprising:
- receiving a first beacon signal from a first external device;
- receiving a second beacon signal from a second external device;
- based on the received first beacon signal, obtaining first information indicating a first distance between the electronic apparatus and the first external device;
- based on the received second beacon signal, obtaining second information indicating a second distance between the electronic apparatus and the second external device;
- receiving third information indicating a third distance between the first external device and the second external device from at least one of the first external device or the second external device;
- identifying whether the first beacon signal from the first external device is invalid, based on the first distance, the second distance, and the third distance; and
- identifying whether the first distance between the electronic apparatus and the first external device is invalid, based on the first distance, the second distance, and the third distance.

11. The method of claim 10, wherein the identifying whether the first beacon signal from the first external device is invalid comprises, based on the third distance being less than a difference between the first distance and the second distance, or based on the third distance being greater than a sum of the first distance and the second distance, identifying that the first external device spoofs an actual location of the first external device relative to the electronic apparatus.

12. The method of claim 11, wherein the identifying whether the first beacon signal from the first external device is invalid comprises, based on the second external device being a trusted device, identifying the first external device spoofs the actual location of the first external device relative to the electronic apparatus.

13. The method of claim 11, wherein the receiving the third information comprises:
- receiving the third information from both the first external device and the second external device.

14. The method of claim 11, wherein the identifying whether the first beacon signal from the first external device is invalid comprises:
- receiving a third beacon signal from a third external device;
- obtaining fourth information indicating a fourth distance between the electronic apparatus and the third external device based on the third beacon signal;
- receiving fifth information indicating a fifth distance between the first external device and the third external device from at least one of the first external device or the third external device; and
- based on the fifth distance being less than a difference between the first distance and the fourth distance, or the fifth distance being greater than a sum of the first distance and the fourth distance, identifying that the first external device spoofs the actual location of the first external device relative to the electronic apparatus.

15. The method of claim 14, wherein the obtaining the first information and the second information comprises:
- synchronizing an internal time of the electronic apparatus and an internal time of the first external device;
- receiving timing information on a time that the first external device transmits the first beacon signal; and
- based on the first beacon signal being received from the first external device, obtaining the first information, based on the timing information.

16. The method of claim 15, wherein the identifying whether the first beacon signal from the first external device is invalid comprises:
- storing the first distance;
- obtaining sixth information indicating a sixth distance between the electronic apparatus and the first external device based on the third beacon signal;

identifying a distance change between the electronic apparatus and the first external device based on the first information and the sixth information; and based on the distance change being equal to or greater than a predetermined threshold value, identifying that the first external device spoofs the actual location of the first external device relative to the electronic apparatus.

17. The method of claim 10, wherein the third information is included in at least one of the first beacon signal or the second beacon signal.

18. The method of claim 10, further comprising, based on identifying that the first external device spoofs an actual location of the first external device relative to the electronic apparatus, displaying a notification indicating that the first external device spoofs the actual location of the first external device relative to the electronic apparatus.

19. A non-transitory computer-readable recording medium including a program for executing a method of an electronic apparatus determining whether an external device spoofs a location thereof, the method comprising:

receiving a first beacon signal from a first external device;

receiving a second beacon signal from a second external device;

based on the received first beacon signal, obtaining first information indicating a first distance between the electronic apparatus and the first external device;

based on the received second beacon signal, obtaining second information indicating a second distance between the electronic apparatus and the second external device;

receiving third information indicating a third distance between the first external device and the second external device from at least one of the first external device or the second external device;

identifying whether the first beacon signal from the first external device is invalid, based on the first distance, the second distance, and the third distance; and identifying whether the first distance between the electronic apparatus and the first external device is invalid, based on the first distance, the second distance, and the third distance.

* * * * *